(12) United States Patent
Beutner (10) Patent No.: US 10,093,387 B2
(45) Date of Patent: Oct. 9, 2018

(54) BICYCLE, IN PARTICULAR MOUNTAIN BIKE, WITH AN ELECTRICAL DRIVE

(71) Applicant: Winora-Staiger GmbH, Sennfeld/Schweinfurt (DE)

(72) Inventor: Ingo Beutner, Gemuenden (DE)

(73) Assignee: Winora-Staiger GmbH, Sennfeld/Schweinfurt (DE)

( * ) Notice: Subject to any disclaimer, the term of this patent is extended or adjusted under 35 U.S.C. 154(b) by 0 days.

(21) Appl. No.: 14/017,999

(22) Filed: Sep. 4, 2013

(65) Prior Publication Data
US 2014/0060950 A1 Mar. 6, 2014

(30) Foreign Application Priority Data
Sep. 6, 2012 (DE) .......... 10 2012 017 647

(51) Int. Cl.
B62M 9/16 (2006.01)
B62M 6/55 (2010.01)
B62K 25/28 (2006.01)

(52) U.S. Cl.
CPC ............ *B62M 6/55* (2013.01); *B62K 25/286* (2013.01); *B62M 9/16* (2013.01)

(58) Field of Classification Search
CPC ........ B62M 9/16; B62K 25/286; B62K 25/28; B62K 25/30
USPC ...................................................... 280/284
See application file for complete search history.

(56) References Cited

U.S. PATENT DOCUMENTS

| 2,460 A | * | 3/1901 | Scoucy, Jr. ............ 15/257.07 |
| 4,299,582 A | | 11/1981 | Leitner |
| 4,541,500 A | * | 9/1985 | Gelhard ............... 180/205.2 |
| 5,074,829 A | * | 12/1991 | Menge, Sr. ............ 475/182 |

(Continued)

FOREIGN PATENT DOCUMENTS

| DE | 128234 | 2/1802 |
| DE | 2852441 | 9/1979 |

(Continued)

OTHER PUBLICATIONS

European Search Report dated Dec. 12, 2013 for counterpart European patent application No. 13004372.2.

(Continued)

*Primary Examiner* — Joseph M Rocca
*Assistant Examiner* — Daniel S Yeagley
(74) *Attorney, Agent, or Firm* — Shuttleworth & Ingersoll, PLC; Timothy J. Klima (57) ABSTRACT

A bicycle has a main frame, a rear suspension having a spring and guiding a wheel along a prescribed path and an electric drive mounted on the main frame. A driving pinion thereof being is disposed coaxial to the shaft of a bottom bracket, and at least one driven pinion is disposed coaxial to the rear wheel and operationally connected to the driving pinion of the electric drive by a chain. A chain segment transmitting torque from the driving to the driven pinions is guided by a chain deflector. A distance between where the chain segment engages the driven pinion and the point of the chain deflector about which the chain is substantially pivoted when the wheel is deflected changes so slightly that the crank arms of the bottom bracket rotate by a maximum permissible angle relative to a non-deflected position of the wheel when the spring is deflected.

22 Claims, 6 Drawing Sheets

(56) References Cited

U.S. PATENT DOCUMENTS

| | | | |
|---|---|---|---|
| 5,908,078 A * | 6/1999 | Belil Creixell | 180/219 |
| 6,203,042 B1 * | 3/2001 | Wilcox | 280/284 |
| 6,296,072 B1 * | 10/2001 | Turner | B62M 6/55 |
| | | | 180/206.2 |
| 6,851,497 B1 * | 2/2005 | Yoshiie et al. | 180/206.4 |
| 7,210,695 B2 * | 5/2007 | Griffiths | 280/283 |
| 7,344,468 B2 * | 3/2008 | Chuo | 475/182 |
| 7,938,424 B2 * | 5/2011 | Arraiz | 280/284 |
| 8,469,381 B2 * | 6/2013 | Dodman et al. | 280/281.1 |
| 2003/0074985 A1 | 4/2003 | Liao | |
| 2003/0111284 A1 * | 6/2003 | Chou et al. | 180/220 |
| 2005/0178538 A1 | 8/2005 | Morita | |
| 2005/0246152 A1 * | 11/2005 | Kokatsu et al. | 703/22 |
| 2006/0030440 A1 * | 2/2006 | Zmurko | 474/80 |
| 2010/0194182 A1 * | 8/2010 | Katz | 301/109 |
| 2011/0284303 A1 * | 11/2011 | Shwartz | 180/220 |
| 2012/0038130 A1 | 2/2012 | Wuthrich | |
| 2012/0048635 A1 * | 3/2012 | Kuroki | B62M 6/45 |
| | | | 180/206.2 |

FOREIGN PATENT DOCUMENTS

| | | | |
|---|---|---|---|
| DE | 19726067 | | 12/1998 |
| DE | 102010028667 | A1 | 11/2011 |
| DE | 102010051727 | A1 | 5/2012 |
| EP | 0645300 | | 3/1995 |
| EP | 645300 | A1 * | 3/1995 |
| EP | 934873 | A2 * | 8/1999 |
| EP | 1564128 | | 8/2005 |
| FR | 2766452 | A1 * | 1/1999 |
| FR | 2807730 | | 10/2001 |
| GB | 190102460 | A * | 3/1901 |
| JP | 09328092 | A * | 12/1997 |
| WO | 0043259 | | 7/2000 |
| WO | WO 03064243 | A1 * | 8/2003 |
| WO | WO 2004045940 | A2 * | 6/2004 |

OTHER PUBLICATIONS

Mountainbike NL Forum, Apr. 7, 2010 [See Machine Translation of Jan. 1, 2016 Opposition Paper and Amendment filed Feb. 20, 2017 for concise explanation of relevance].

Falco: News, Aug. 14, 2010 [See Machine Translation of Jan. 11, 2016 Opposition Paper and Amendment filed Feb. 20, 2017 for concise explanation of relevance].

Share the Ride Article , First Look Ghost E-Ndure Electric—Eurobike 2010, Sep. 1, 2010 [See Machine Translation of Jan. 11, 2016 Opposition Paper and Amendment filed Feb. 20, 2017 for concise explanation of relevance].

Bike Test Special, 2011er Bikes, Oct. 2010 [See Machine Translation of Jan. 11, 2016 Opposition Paper and Amendment filed Feb. 20, 2017 for concise explanation of relevance].

Opposition Paper dated Jan. 11, 2016, *Bergamont Fahrradvertriebs Gmbh* v. *Winora-Staiger GmbH*.

* cited by examiner

BICYCLE, IN PARTICULAR MOUNTAIN BIKE, WITH AN ELECTRICAL DRIVE

This application claims priority to German Patent Application DE102012017647.3 filed Sep. 6, 2012, the entirety of which is incorporated by reference herein.

The invention relates to a bicycle, particularly a mountain bike, having a main frame, a rear suspension for a rear wheel pivotally joined to at least one pivot bearing on the main frame and guiding the hub of the rear wheel along a prescribed path while deflecting in and out, an electric drive mounted on the main frame, the driving pinion thereof being coupled to the shaft of a bottom bracket, and at least one driven pinion provided on the rear wheel, coaxial with the hub, and operationally connected to the driving pinion of the electric drive by means of a chain.

For some time bicycles have been equipped with powerful electric drives supporting the bicycle rider while riding. Two types of drives are generally differentiated. For one type of drive, the electric drive is integrated directly in the hub of the front or rear wheel. For an alternative type of drive, the bottom bracket of the bicycle is integrated in the electric drive and the electric drive is mounted on the main frame in the region of the bottom bracket.

For the latter solution, wherein the electric drive is mounted on the main frame, the integration of the electric drive into a bicycle having a rigid rear end for the rear wheel is relatively simple. If, on the other hand, the bicycle is equipped with a rear suspension, then the motion of the rear end when the spring deflects in and out can influence both the drive behavior of the electric drive and the pedal behavior of the user as a function of the trajectory along which the hub of the rear wheel moves.

The rear suspension is typically pivotally connected to the main frame so that the hub of the rear wheel moves along an arc-shaped path when deflecting in and out, wherein the curve of the path is determined by the type of pivotal connection of the rear end to the main frame, that is, by the kinematics of the rear end. The rear end typically does not pivot in exactly a rotary motion about the shaft of the bottom bracket as the axis of rotation. Rather, the path along which the rear wheel moves when deflecting in and out comprises an arc shape or even an S shape having a moving virtual center of rotation.

Based on the prescribed path, depending on the type of rear end, the distance between the axis of rotation of the driving pinion and the axis of rotation of the driven pinion changes, particularly when deflecting in and out. Because the driven pinion must lock up on the rear wheel in the driving direction, increasing the distance between the two axes of rotation causes the chain to travel backwards, that is, a reverse motion opposite the running direction of the chain, causing a so-called pedal backlash, that is, a reverse motion of the pedal opposite the pedaling direction of the pedal.

Due to the fact that the outer diameter of the driving pinion is relatively large for electric bottom bracket drives currently in use, typically 38 teeth, the reverse motion of the chain causes at most a negligible pedal backlash, particularly if a driven pinion having a smaller number of teeth is engaged with the chain.

For some time, it has been thought that electric bottom bracket drives wherein the driving pinion comprises a significantly smaller number of teeth should be used. Fewer than 21 teeth are intended. The reason for this is that the electric drives should be constructed as compactly as possible in order to make installation easier and save weight, but simultaneously must provide sufficiently high torque for the drive. In order to achieve this, an electric bottom bracket drive has been available recently wherein the required torque is provided by driving a relatively small driving pinion at a high speed.

This type of electric drive can be used with no problems on bicycles having a rigid rear axle. For bicycles having a rear suspension, the small pinion can, depending on the type of rear end, cause massive problems with respect to pedal backlash by interacting with the motion that the rear wheel undergoes when deflecting in and out and its travel due to the kinematics of the rear end in the form of the wheel lift curve. As evaluations have demonstrated, the combination of the wheel lift curve that is disadvantageous in terms of pedal backlash and the transmission ratio between the driving pinion of the electric drive and the typically freely selectable driven pinion of the rear wheel can cause pedal backlash wherein the crank arms or pedal cranks of the bottom bracket can be displaced opposite the direction of rotation by an angle of up to 30° opposite the direction of rotation when the spring is deflected in and out. There are hardly any problems with pedal backlash for wheel lift curves that are directed upward and forward. The situation is different, however, if the wheel lift curve is directed upward and rearward. This motion directed upward and rearward causes a change in the distance between the rear wheel hub and the driving pinion. If this motion is also takes place for a ratio wherein the driving pinion of the bottom bracket motor comprises a significantly smaller diameter in comparison with the currently engaged driven pinion of the rear wheel, then the pedal backlash is amplified accordingly.

Starting from this prior art, the object of the invention is to provide a bicycle having an electric drive wherein the chain reverse motion can be reduced in a targeted manner to the extent that even the use of electric drives having small driving pinions is possible without a problem.

Said object is achieved according to the invention by a bicycle having features as described herein, and particularly in that the upper chain segment serving for transmitting torque from the driving pinion to the driven pinion is guided under tension by means of a chain deflector disposed between the driving pinion and the driven pinion of the rear wheel, and the chain deflector is positioned between the driving pinion and the driven pinion such that the distance between the point at which the upper chain segment is currently engaged with the driven pinion of the rear wheel and the point of the chain deflector about which the chain is substantially pivoted when the rear wheel is deflected in and out, changes at most so slightly over at least part of the path along which the hub of the rear wheel travels when the spring is deflected in and out that the crank arms of the bottom bracket rotate by a maximum permissible angle relative to the non-deflected position of the rear wheel when the spring is deflected in and out.

A substantial idea of the invention is that the upper segment of the chain engaged with the driving pinion and the driven pinion of the rear wheel for transmitting torque between the same according to the selected ratio is supported by a chain deflector. The chain deflector is thereby disposed relative to the driving pinion so that the chain deflector supports the upper segment of the chain in any position of the rear end, that is, including when the rear wheel is fully deflected inward.

For conventional bicycles having electric drive in the region of the bottom bracket, the link of the chain that is the last link engaged with the driving pinion in the driving direction of the chain forms the point about which the upper chain segment rotates when the rear end is completely deflected inward while the rear end moves along a predetermined trajectory. The trajectory of the rear end, and thus that of the driven pinion of the rear wheel currently engaged with the chain when the spring is deflected inward, thereby depends directly on the kinematics of the rear end.

The invention proposes that the motion of the rear end is decoupled from the position of the chain on the driving pinion. The chain deflector serves this purpose and now alternatively defines the point about which the upper chain segment engaged with the driven pinion pivots. It is thus achieved that when the rear end deflects inward, the chain backlash no longer acts directly on the driving pinion.

The position of the chain deflector is selected so that the point at which the upper chain segment is supported by the chain deflector is disposed in a region that is disposed at least adjacent to the actual center of rotation about which the rear end actually rotates. It is thus achieved that the distance between the point at which the upper chain is supported by the chain deflector and the point at which the upper chain segment is engaged with the driven pinion, remains at least nearly unchanged or changes by a limited amount at least over a portion of the motion of the rear wheel when the spring deflects in and out. The change in distance is limited by correspondingly arranging the chain deflector so that the crank arms of the bottom bracket are displaced by a maximum permissible angle from the non-deflected position when the rear wheel is deflected in or out. In this context, it must be noted that both a negative displacement of the drive pinion and thus the crank arms, that is, acting opposite the pedal direction, and a targeted positive displacement of the drive pinion and thus the crank arms in the pedal direction are possible, as defined by the ± symbol. The angle thus originates at a zero position at which the rear wheel is located in the non-deflected position while riding.

It must also be noted that at least the point about which the upper chain segment pivots when the spring deflects in and out is optionally displaced along the chain deflector. The point at which the upper chain segment engages with the driven pinion is also optionally displaced. It is critical that the distance between said optionally wandering points changes only far enough that the crank arms are displaced by a maximum of the permissible angle.

Depending on the type and design of the rear end, the center of rotation can also be displaced along a prescribed path, for example if the path comprises an S-shaped curve along which the hub of the rear wheel is displaced when the spring is deflected in and out. In such a case the chain deflector is disposed relative to the driving pinion so that the influence of the chain backlash motion is minimized. The chain deflector can optionally also be disposed relative to the driving pinion and the rear end so that pedal backlash occurs in cases in which a limited pedal backlash is actually desired, for example, such as for hill climbs, for which the chain is guided via a driven pinion having as large a diameter as possible, while the pedal backlash is prevented during hill descents.

Further advantages and advantageous refinements arise from the following description and the subclaims.

The maximum permissible angle is preferably in a range of ±20° starting from the non-deflected position. The maximum permissible angle is particularly preferably in a range of ±15°, preferably a maximum of ±10°. As previously indicated, both a negative displacement of the drive pinion and thus the crank arms, that is, acting opposite the pedal direction, and a targeted positive displacement of the drive pinion and thus the crank arms in the pedal direction are possible, as defined by the ± symbol.

In order to make the chain deflector easier to install, to allow the installation of different driving pinions, and/or to give the user the ability to adjust the pedal backlash in a targeted manner, the chain deflector can be adjusted relative to the driving pinion in a preferred embodiment. The chain deflector or the attachment to the main frame or to the rear end can have eccentric retaining screws, elongated holes, etc. for adjustment.

In a particularly preferred embodiment of the chain deflector according to the invention, the chain deflector is at a fixed location relative to the driving pinion, and thus does not change position relative to the driving pinion when the rear wheel spring deflects in and out. Said type of mounting is advantageous particularly if the kinematics of the rear end causes the hub of the rear wheel to be displaced along an arc-shaped path, wherein an at least approximately motionless center of rotation of the hub remains intact. Furthermore, the arrangement of the chain deflector at a fixed location is also advantageous because the effort for assembly is relatively low.

In a particularly preferred embodiment of the arrangement at a fixed location of the chain deflector, it is proposed that pivot bearings for the rear end are provided adjacent to the electric drive on the main frame and the chain deflector is disposed on the main frame concentric with or immediately adjacent to the pivot bearing of the displaceable rear end.

In place of providing the chain deflector on or adjacent to the pivot bearing, one embodiment having a chain deflector in a fixed location proposes that the chain deflector is mounted on a strut mounted at a suitable location on the main frame, such as on the seat tube or on the down tube of the main frame. The position of the strut is thereby selected so that the point about which the upper chain segment pivots at the chain deflector is disposed in the region of the imaginary center of rotation of the rear end. Particularly if the chain deflector is designed to be adjustable, the strut provided on the main frame for the chain deflector provides the potential for mounting the chain deflector at a suitable location depending on the type of rear end installed.

For an alternative embodiment for arranging the chain deflector at a fixed location, it is proposed that the chain deflector is displaceable along a prescribed trajectory relative to the driving pinion. The use of the displaceable chain deflector is particularly advantageous if rear ends are used wherein the hub of the rear wheel is displaced along a path deviating from a forward-facing arc shape, such as a rearward-facing arc shape or an S shape, when the spring is deflected in and out. By displacing the chain deflector when the spring is deflected in and out, the desired effect of the chain deflector can optionally remain intact even over the entire displacement of the rear end when the spring is deflected in and out.

For a displaceable chain deflector, it is further particularly advantageous that the distance between the driven pinion and the chain deflector not only changes by only a limited amount at most. It must further be considered that the distance from the chain deflector to the driving pinion remains unchanged as much as possible. This can be achieved, for example, in that the axis of rotation of the driving pinion and the pivot axis of the chain deflector are identical, or at least are adjacent to each other. For more complex motion curves, an approximately constant distance is maintained between the chain deflector and the driving axis over at least part of the motion of the chain deflector.

It is particularly advantageous if the chain deflector is provided on a displaceable lever or on a displaceable lever arrangement, the motion thereof being coupled to the motion of the rear end such that the chain deflector is displaced along a trajectory correlated with the trajectory of the rear end. The motion of the chain deflector is matched to the motion of the rear end, preferably by means of a mechanical coupling, such as by corresponding actuating elements, but can also be done by means of a hydraulic coupling or hydraulically supported.

A wide range of embodiments of the rear end can be used for the invention. The most well-known rear end designs are the single pivot, the Dave Weagle link, the Horst link, the VPP (Virtual Pivot Point) link, or the multi-pivot, as well as derivatives of said rear end designs. An of said rear end designs are suitable in general for the present invention.

In general, a rear end having two chain stays as components that are pivotally connected to the main frame can be used. The term "pivotally connect" or "pivotally connected" is understood according to the invention to mean that the chain stays are pivotally supported directly on a pivot bearing on the main frame, or that the chain stays are pivotally supported indirectly on the main frame of the bicycle by means of a lever, a rocker, or the like. In order to dampen the spring suspension of the rear end, the rear end is further coupled to a damping device in a known manner, wherein the damping device is here again directly or indirectly operationally connected to the rear end by means of levers, lever arrangements, or rocker arms, etc. for force transmission. The damping device in turn is preferably pivotally supported on the main frame.

In a particularly preferred embodiment, the rear end comprises two seat stays as additional components, said stays together forming the dropout for the rear wheel and being fixed connected to the chain stays near the dropout, wherein the chain stays in turn are hinged to a lever at the opposite ends thereof, said lever in turn being supported at the pivot bearing of the main frame. The seat stays, in contrast, are each hinged to a second lever at the opposite ends thereof, said lever in turn being pivotally supported at a further pivot bearing provided on the main frame.

For an alternative embodiment, the rear end comprises two chain stays as well as two seat stays as additional components, together forming the dropout for the rear wheel and hinged to chain stays near the dropout. The opposite ends of the seat stays are each hinged to the main frame by means of a lever or rocker. The result is a particularly displaceable rear end that implements a wide range of trajectories when the spring is deflected in and out, depending on the lengths of the stays and the positioning of the joints.

In order to implement a chain deflector that is displaceable relative to the driving pinion, the trajectory thereof being coupled to the motion of the rear end, the invention proposes that the chain deflector is attached to a component of the rear end, preferably to one of the chain stays. It is also possible, however, to attach the chain deflector displaceably to the rear end and to couple the same to other components, such as one of the seat stays, or to the main frame, by means of suitable lever arrangements.

The chain deflector is a chain pinion in a particularly preferred embodiment. The chain pinion is not only simple to install and relatively free of wear and unlikely to fail. The chain is also securely guided and supported by the chain pinion, and even large dimensional deviations in the chain curve can be compensated for. The chain can also be diverted without a problem when using pinion packages wherein the chain is displaced in a known manner between the pinions by means of a shifting mechanism in order to change the ratio.

Alternatively or additionally the chain deflector can also be formed by an arrangement of a plurality of pinions mounted, for example, on a pivotally supported common carrier. The use of a sliding shoe or a sliding guide as the chain deflector is also possible, wherein the chain is guided and supported along a sliding element made of a low-wear material.

The invention described above is particularly suitable for combined use with an electric drive having a driving pinion engaged with the chain and comprising a relatively small number of teeth, preferably less than or equal to 20. Particularly for driving pinions of such small size and wheel lift curves leading to severe pedal backlash, the problems described above with respect to pedal backlash are particularly severe and can be addressed by the invention in a very elegant and targeted manner.

The invention is explained in more detail below using an embodiment example and two derivations with reference to the included drawing. Shown are.

Figure 1:
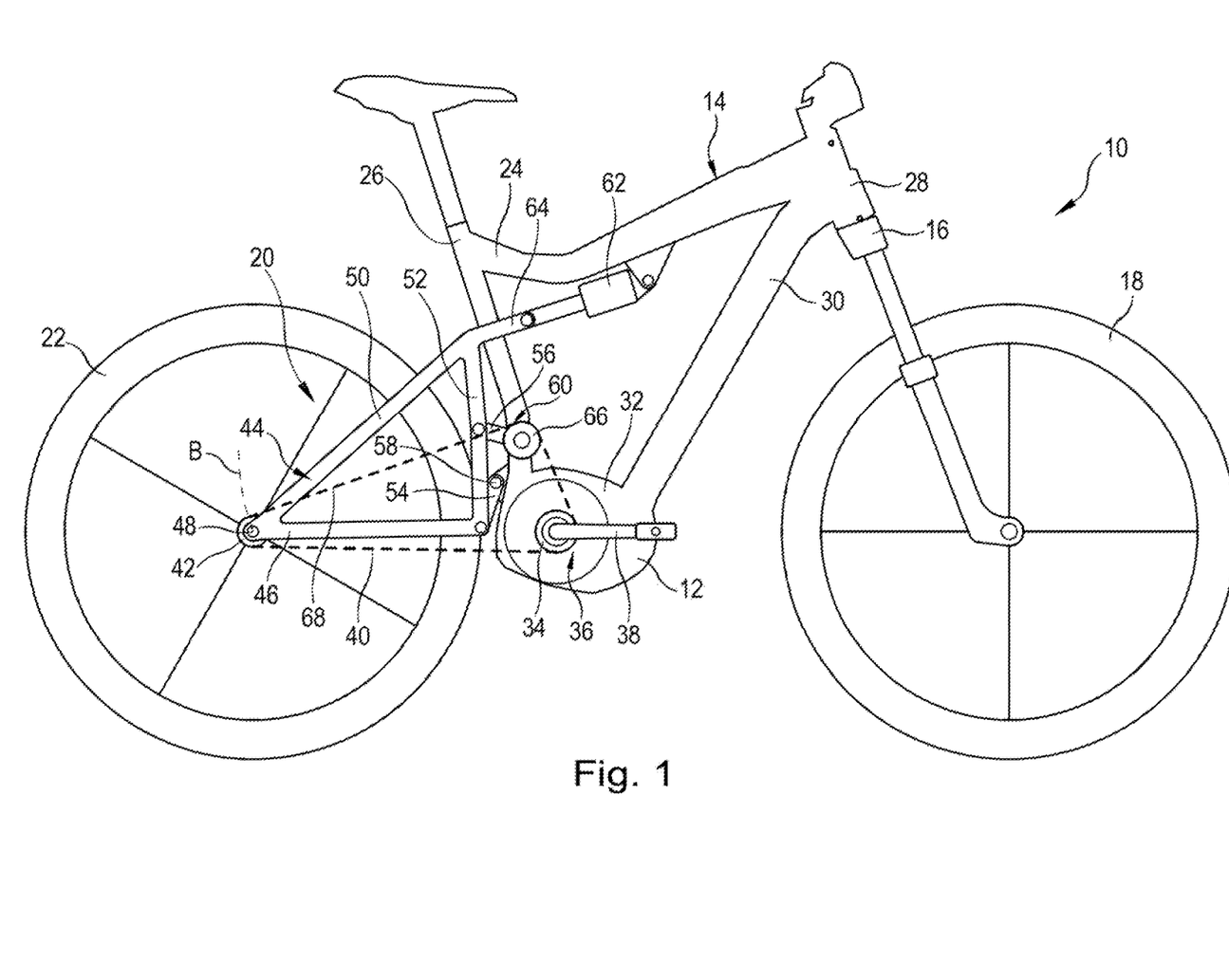
FIG. 1 is a schematic side view of a bicycle according to the invention having a rear suspension implemented as a VPP link, in the rest position.
Figure 2:
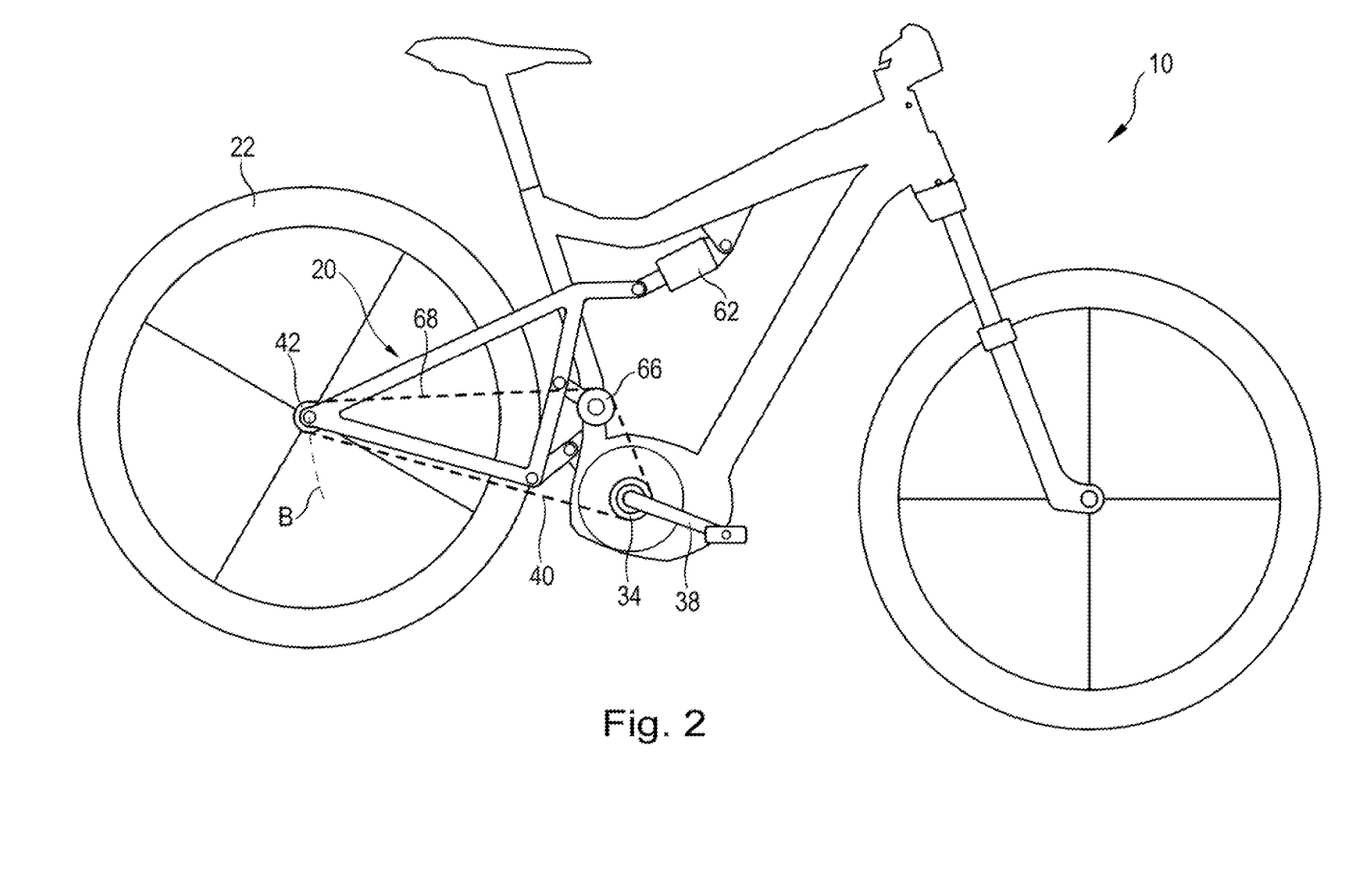
FIG. 2 is a schematic side view of the bicycle according to the invention from FIG. 1 having the rear end completely deflected inward.

FIGS. 1 and 2 show schematic side views of a first embodiment of a bicycle 10 according to the invention having an electric drive 12. The bicycle 10 comprises a main frame 14, a fork 16 having a front suspension 18 and a rear suspension (rear end) 20 for the rear wheel 22.

The main frame 14 comprises a bent top tube 24, one end thereof being fixedly connected to the seat tube 26 and the other end thereof to a head tube 28. The down tube 30 is attached to the head tube 28, in which the fork 16 is rotationally supported in a known manner. The other end of the down tube is fixedly connected to a frame element 32. The bent end of the seat tube 26 is also fixedly connected to the frame element 32.

The frame element 32 is implemented as an interface for the electric drive 12. The electric drive 12 is inserted in the frame element 32 that is adapted to the shape and design of the housing of the electric drive 12 and is releasable connected thereto by means of screws, for example.

As can be seen, the electric drive 12 is implemented as a bottom bracket motor. This means that the driving pinion 34 of the electric drive 12 is coaxial with the shaft of the bottom bracket 36 of the bicycle 12. The driving pinion 34 is mechanically coupled to the shaft of the pedal bearing 36 by means of a transmission not shown in further detail and transmits the torque that the user exerts on the crank arms 38. For the bicycle 10 according to the invention, a particularly small driving pinion 34 is used, comprising a maximum of 20 teeth. The transmission ratio between the actual bottom bracket and the driving pinion 34 in the electric drive 12 is thus also correspondingly high.

One reason for using a relatively small driving pinion 34 is that high speeds can be provided for the electric drive 12 in a small installation space, in comparison with conventional drives, so that the electric drive 12 responds more quickly. A chain 40 is wound on the driving pinion 34 and transmits the torque to one of the driven pinions 42 of a pinion package of the rear wheel 22.

The rear end 20 in this embodiment example is implemented as a VPP link (Virtual Pivot Point). The rear end 20 comprises two closed triangular frames 44, each formed by a chain stay 46, a seat stay 50 fixedly connected thereto at the dropout 48, and a connecting stay 52 connecting the ends of the chain stay 46 and the seat stay 50.

The two triangular frames 44 are also connected to each other and form a rigid rear end 20. Two lever pairs 54 and 56 are pivotally attached to the rear end. The first lever pair 54 shown at the bottom of FIGS. 1 and 2 is pivotally supported at a first pivot bearing 58 provided on the seat tube 26, while the second lever pair 56 is pivotally supported at a second pivot bearing 60 provided above the first pivot bearing 58 on the seat tube 26.

The rear end 20 is further connected to a damping device 62 pivotally supported on the underside of the top tube 24, said damping device being coupled to a fork-shaped extension 64 of the two seat stays 50.

If the rear wheel 22 the bicycle 10 according to the invention travels over an obstacle, the entire rear end 20 is raised against the effect of the damping device 62. Due to the shape and design of the rear end 20, the position of the lever pairs 54 and 56, and the position of the pivot bearings 58 and 60, the rear wheel 22 travels along a path B shown in FIGS. 1 and 2 as a dashed line into the final inward deflected position thereof (cf. FIG. 2) and is displaced back to the initial position thereof (cf. FIG. 1) by the damping device 62 after passing over the obstacle.

According to the invention, the bicycle 10 is additionally equipped with a chain pinion 66 rotationally supported on the seat tube 26 of the main frame 14 between the driving pinion 34 of the electric drive 12 and the hub or the driven pinion 42 of the rear wheel 22. The chain pinion 66 acts as a chain deflector for the upper chain segment 68 of the chain 40, by means of which the torque is transmitted from the driving pinion 34 to the driven pinion 42 of the rear wheel 22.

It is thus achieved that the chain 40 is deflected before the driving pinion 34 and motion of the rear end 20 does not affect the operation of the electric drive 12 and the use of the crank arms 38, as described in more detail below with reference to the two FIGS. 1 and 2.

The position of the chain pinion 66 is not selected arbitrarily. Rather, a substantial idea of the invention is that the upper chain segment 68 of the chain 40 is supported by the chain pinion 66 acting as the chain deflector. The chain pinion 66 is thereby disposed relative to the driving pinion 34 such that the chain pinion 66 supports the upper chain segment 68 in every position of the rear end 20, that is, even when the rear wheel 22 is deflected fully inward.

The invention proposes that the motion of the rear end 20 is decoupled from the position of the chain 40 on the driving pinion 34. To this end, a point is provided by means of the chain pinion 66 about which pivots the upper chain segment 68 engaged with the driven pinion 42.

The position of the chain pinion 66 acting as the chain deflector is thereby selected so that the point at which the upper chain segment 68 is supported by the chain pinion 66 is disposed in a region that is disposed at least adjacent to the actual center of rotation about which the rear end 20 is displaced. It is thus achieved that the distance between the point at which the upper chain segment 68 is supported by the chain pinion 66 and the point at which the upper chain segment 68 is engaged with the driven pinion 42, remains at least nearly unchanged at least over a portion of the motion of the rear wheel 22 when the spring deflects in and out.

Because the distance between the point at which the upper chain segment 68 is supported by the chain pinion 66 and the point at which the upper chain segment 68 engages with the driven pinion 42 of the rear wheel 22 increases only slightly, the chain backlash described above occurs at most to a slight extent, so that the undesirable pedal backlash is also minimized. The chain pinion 66 can thereby be positioned with respect to the driving pinion 42 so that the chain backlash motion is either minimized or so that a defined chain backlash motion can be prescribed.

Figure 3:
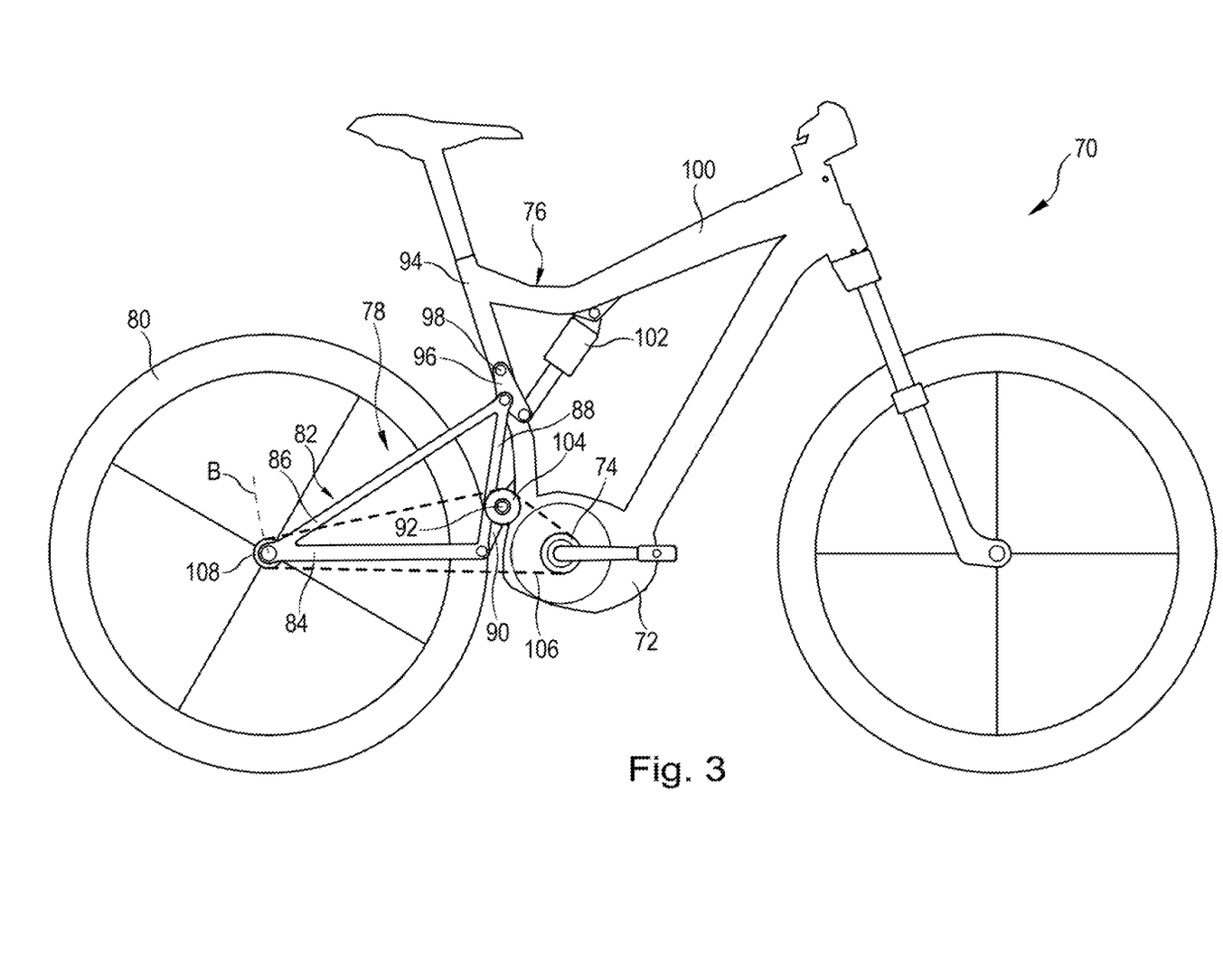
FIG. 3 is a schematic side view of a first derivation of the bicycle according to the invention having a rear suspension in the rest position, wherein the rear end is implemented as a Dave Weagle link.
Figure 4:
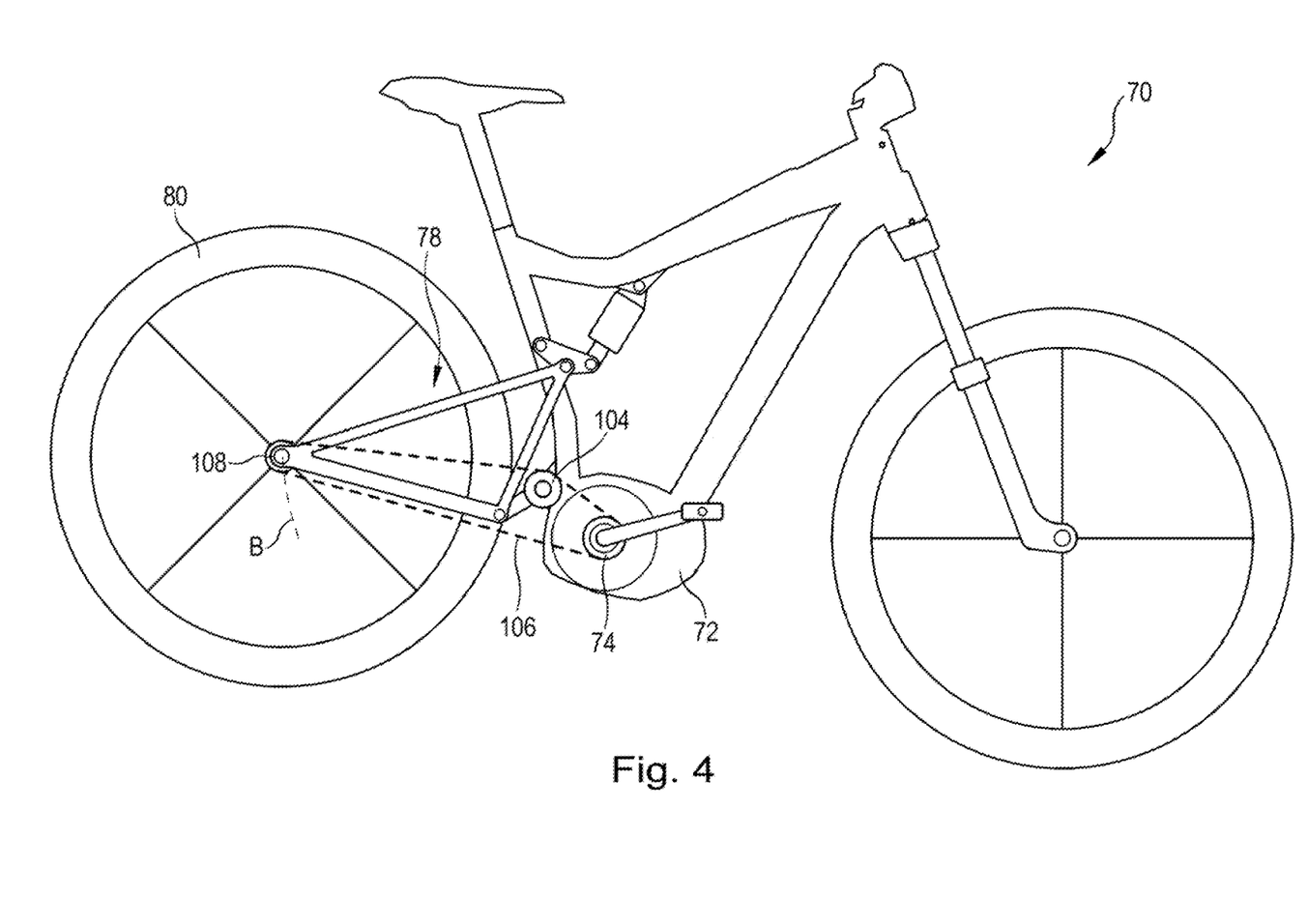
FIG. 4 is a schematic side view of the derivation from FIG. 3 having the rear end completely deflected inward.

A first derivation 70 of the bicycle 10 according to the invention is shown in FIGS. 3 and 4. The components of the bicycle 70 that match the components of the bicycle 10 shown in FIGS. 1 and 2 and that are not significant for the function of the bicycle 70 are thereby not further identified.

Here again the bicycle 70 comprises an electric drive 72 having a relatively small driving pinion 74 and a main frame 76. The substantial difference between the bicycle 70 shown in FIGS. 3 and 4 and the bicycle 10 shown in FIGS. 1 and 2 is the rear end 78 for the rear wheel 80.

The rear end 78 shown in FIGS. 3 and 4 does also comprise two frames 82, each made of a chain stay 84, a seat stay 86, and a connecting stay 88. Each frame 82 is also hinged at the lower end thereof to a lever pair 90 and the two lever pairs 90 of the two frames 82 are pivotally hinged at a common pivot bearing 92 on the seat tube 94 of the main frame 96.

In contrast to the variant shown in FIGS. 1 and 2, the upper end of each frame 82 in this derivation is pivotally connected to a rocker 96, one end thereof being supported at a second pivot bearing 98 on the seat tube 94 and the other end thereof being coupled to a damping device 102 supported on the top tube 100 of the main frame 76.

In this first derivation the bicycle 70 also comprises a chain pinion 104 acting as the chain deflector. The chain pinion 104 in this case, however, is concentric with the axis of the first pivot bearing 92.

When the rear wheel 80 strikes an obstacle, said wheel is raised against the force of the damping device 102. Due to the construction and the pivot points of the rear end 78, said rear end displaces along the path B. At the same time, the chain pinion 104 causes the distance between the chain pinion 104 acting as the center of rotation for the chain 106 and the driven pinion 108 of the rear wheel 80 to remain at least nearly constant, and the undesired pedal backlash does not occur, or occurs at most to a slight degree.

Figure 5:
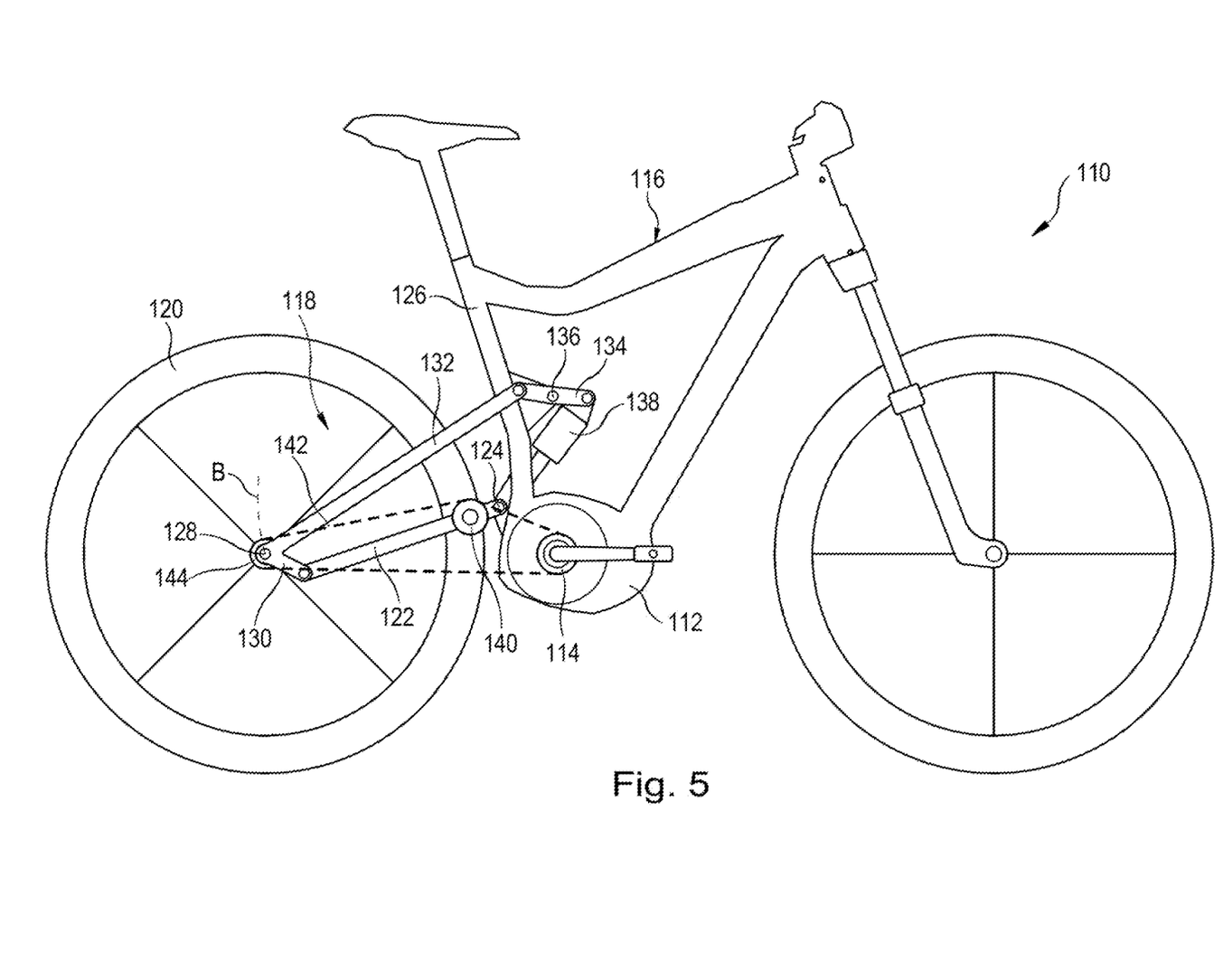
FIG. 5 is a schematic side view of a second derivation of the bicycle according to the invention having a rear suspension in the rest position, wherein the rear end is implemented as a Horst link.
Figure 6:
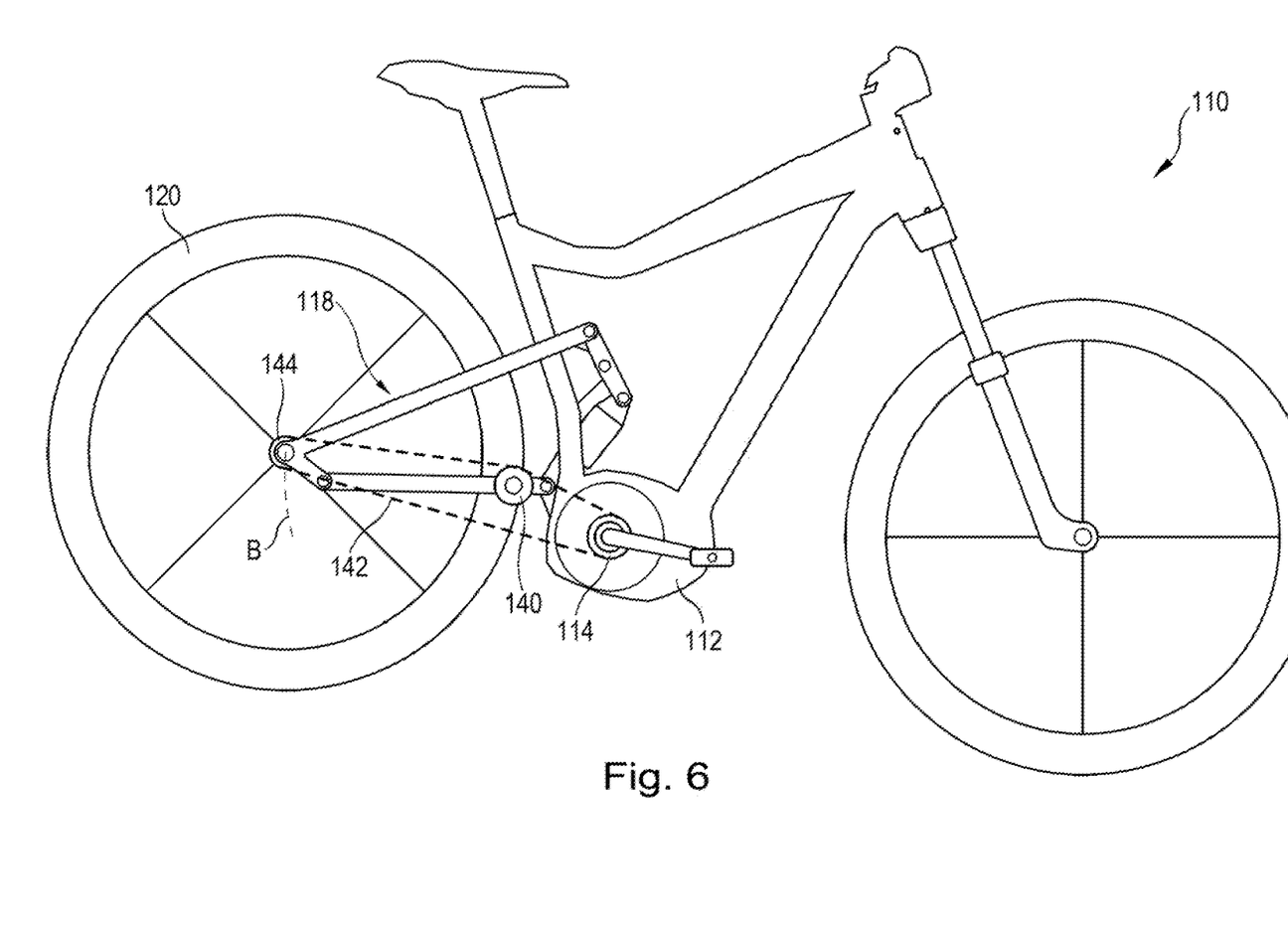
FIG. 6 is a schematic side view of the derivation from FIG. 5 having the rear end completely deflected inward.

A second derivation 110 of the bicycle 10 according to the invention is shown in FIGS. 5 and 6. Here again the components of the bicycle 110 that match the components of the bicycle 10 shown in FIGS. 1 and 2 and that are not significant for the function of the bicycle 110 are thereby not further identified.

The bicycle 110 also comprises an electric drive 112 having a relatively small driving pinion 114 and a main frame 116. A substantial difference between the bicycle 110 shown in FIGS. 5 and 6 and the bicycle 10 shown in FIGS. 1 and 2 is again the rear end 118 for the rear wheel 120.

The rear end 118 shown in FIGS. 5 and 6 does not comprise a frame. Rather, one end of the two chain stays 122 is directly pivotally supported at a first pivot bearing 124 provided near the electric drive 112 on the seat tube 126.

The other end of each chain stay 122 is hinged at a bend 130 to a seat stay 132 near a dropout 128 for the rear wheel 120. The other end of each seat stay 132 is pivotally connected to the end of a common rocker 134. The middle pivot point of the rocker 134 is supported at a second pivot bearing 136 on the seat tube 126, while the other end of the rocker 134 is coupled to a damping device 138 pivotally supported on the seat tube 126 near the electric drive 112.

In this second derivation the bicycle 110 also comprises a chain pinion 140 acting as the chain deflector. The chain pinion 140 in this case is rotationally supported on the right chain stay 122 of the rear end 118 as seen in the travel direction of the bicycle.

When the rear wheel 120 strikes an obstacle, said wheel is raised against the force of the damping device 138. The rear end 118 thereby displaces along a path B arising from the construction of the rear end 118. At the same time, the chain pinion 140 causes the distance between the chain pinion 140 acting as the center of rotation for the chain 142 and the driven pinion 144 of the rear wheel 120 to remain at least nearly constant, and the undesired pedal backlash does not occur, or occurs at most to a slight degree.

For the bicycle according to the invention, the point about which the upper chain segment rotates relative to the main frame can be defined by the type and design of the rear end, so that the pedal backlash caused by the chain backlash motion can be influenced in a targeted manner and reduced.

LIST OF REFERENCE NUMERALS 10 bicycle
12 electric drive
14 main frame
16 fork
18 front suspension
20 rear suspension
22 rear wheel
24 top tube
26 seat tube
28 head tube
30 down tube
32 frame element
34 driving pinion
36 bottom bracket
38 crank arms
40 chain
42 driven pinion
44 frame
46 chain stay
48 dropout
50 seat stay
52 connecting stay
54 lever pair
56 lever pair
58 first pivot bearing
60 second pivot bearing
62 damping device
64 fork-shaped extension
66 chain pinion
68 upper chain segment
70 bicycle
72 electric drive
74 driving pinion
76 main frame
78 rear end
80 rear wheel
82 frame
84 chain stay
86 seat stay
88 connecting stay
90 lever pair
92 first pivot bearing
94 seat tube
96 rocker
98 second pivot bearing
100 top tube
102 damping device
104 chain pinion
106 chain
108 driven pinion
110 bicycle
112 electric drive
114 driving pinion
116 main frame
118 rear end
120 rear wheel
122 chain stay
124 first pivot bearing
126 seat tube
128 dropout
130 bend
132 seat stay
134 rocker
136 second pivot bearing
138 damping device
140 chain pinion
142 chain
144 driven pinion

The invention claimed is:

1. A bicycle, comprising:
a main frame including a seat tube, a down tube and a frame element, wherein the seat tube and the down tube are fixedly connected to the frame element,
a rear suspension for a rear wheel, the rear suspension hinged to the main frame on a pivot bearing and guiding a hub of the rear wheel along a prescribed path when the rear wheel is deflected in and out,
an electric drive mounted on the main frame and including a driving pinion and a housing,
wherein the frame element is an interface for the electric drive and is adapted to a shape of the housing of the electric drive to receive the electric drive, and wherein the electric drive is inserted in the frame element and is releasably connected thereto,
a bottom bracket including a shaft,
the driving pinion being coupled to the shaft of the bottom bracket,
a driven pinion coaxial with the hub of the rear wheel,
a chain operationally connecting the driven pinion to the driving pinion of the electric drive,
an upper chain segment of the chain serving for transmitting torque from the driving pinion to the driven pinion,
a lower chain segment between the driving pinion and the driven pinion,
a chain deflector disposed along the upper chain segment between the driving pinion and the driven pinion of the rear wheel, wherein the chain deflector solely engages and guides the upper chain segment and keeps the upper chain segment under tension, while the lower chain segment between the driving pinion and the driven pinion is unguided,
the chain deflector being positioned between the driving pinion and the driven pinion such that a change in distance between a point at which the upper chain segment is engaged with the driven pinion of the rear wheel and a point of the chain deflector about which the chain is substantially pivoted when the rear wheel is deflected in and out, over at least part of a path along which the hub of the rear wheel travels when the rear wheel is deflected in and out, causes any rotation of crank arms of the bottom bracket to be within a maximum permissible angle relative to a non-deflected position of the rear wheel when the rear wheel is deflected in and out;

wherein the pivot bearing for the rear suspension is provided on the frame element or on the seat tube immediately adjacent to the frame element;

wherein a number of teeth on the driving pinion is less than or equal to 20 teeth;

a crank drive system including the crank arms connected to the shaft of the bottom bracket for allowing manual power input by a user of the bicycle;

a transmission;

the driving pinion being coaxial with the shaft of the bottom bracket and being mechanically coupled to the shaft of the bottom bracket by the transmission;

each of the crank drive system and the electric drive driving the chain and the driven pinion through the driving pinion.

2. The bicycle according to claim 1, wherein the maximum permissible angle is in a range of ±20°.

3. The bicycle according to claim 1, wherein the chain deflector is adjustable relative to the driving pinion.

4. The bicycle according to claim 1, wherein the chain deflector is provided at a fixed location on the main frame relative to the driving pinion.

5. The bicycle frame according to claim 4, wherein the pivot bearing for the rear suspension is provided on the main frame adjacent to the electric drive, and the chain deflector is disposed on the main frame concentric to or immediately adjacent to the pivot bearing of the displaceable rear suspension.

6. The bicycle according to claim 4, wherein the chain deflector is mounted on a strut provided on the main frame.

7. The bicycle according to claim 1, wherein the chain deflector is displaceable relative to the driving pinion along a prescribed trajectory.

8. The bicycle according to claim 7, wherein the chain deflector is provided on a displaceable lever or on a displaceable lever arrangement coupled to a displacement of the rear suspension such that the chain deflector travels along the prescribed trajectory thereof.

9. The bicycle according to claim 1, wherein the rear suspension comprises two chain stays hinged to the main frame, and a damping device coupled to the main frame and the rear suspension to damp motion of the rear suspension.

10. The bicycle according to claim 9, wherein the rear suspension comprises two seat stays, a respective one of the two chain stays being fixedly connected at one end to a respective one of the two seat stays to form a dropout for the rear wheel, the chain stays being pivotably joined at other ends thereof to a lever, the lever in turn being supported on the pivot bearing of the main frame, the seat stays each being pivotably joined at the other ends thereof to a second lever or rocker, and the second lever or rocker is supported at a further pivot bearing provided on the main frame.

11. The bicycle according to claim 9, wherein the chain stays of the rear suspension are supported directly at the pivot bearing.

12. The bicycle according to claim 11, wherein the rear suspension comprises two seat stays, a respective one of the two chain stays being pivotably connected at one end to a respective one of the two seat stays to form a dropout for the rear wheel, another end of the respective one of the two seat stays being pivotably joined to the main frame by a lever or rocker.

13. The bicycle according to claim 9, wherein the chain deflector is mounted on a component of the rear suspension.

14. The bicycle according to claim 1, wherein the chain deflector is a chain pinion.

15. The bicycle according to claim 1, wherein the maximum permissible angle is in a range of ±15°.

16. The bicycle according to claim 1, wherein the maximum permissible angle is in a range of ±10°.

17. The bicycle according to claim 16, wherein the bicycle is a mountain bike.

18. The bicycle frame according to claim 17, wherein the pivot bearing for the rear suspension is provided on the main frame adjacent to the electric drive, and the chain deflector is connected to the main frame substantially coaxial to the pivot bearing of the rear suspension.

19. The bicycle according to claim 1, wherein the bicycle is a mountain bike.

20. The bicycle frame according to claim 19, wherein the pivot bearing for the rear suspension is provided on the main frame adjacent to the electric drive, and the chain deflector is connected to the main frame substantially coaxial to the pivot bearing of the rear suspension.

21. A bicycle, comprising:

a main frame including a seat tube, a down tube and a frame element, wherein the seat tube and the down tube are fixedly connected to the frame element, a rear suspension for a rear wheel, the rear suspension hinged to the main frame on a pivot bearing and guiding a hub of the rear wheel along a prescribed path when the rear wheel is deflected in and out, an electric drive mounted on the main frame and including a driving pinion and a housing, wherein the frame element is an interface for the electric drive and is adapted to a shape of the housing of the electric drive to receive the electric drive, and wherein the electric drive is inserted in the frame element and is releasably connected thereto, a bottom bracket including a shaft, the driving pinion being coupled to the shaft of the bottom bracket, a driven pinion coaxial with the hub of the rear wheel, a chain operationally connecting the driven pinion to the driving pinion of the electric drive, an upper chain segment of the chain serving for transmitting torque from the driving pinion to the driven pinion, a lower chain segment between the driving pinion and the driven pinion, a chain deflector disposed along the upper chain segment between the driving pinion and the driven pinion of the rear wheel, wherein the chain deflector solely engages and guides the upper chain segment and keeps the upper chain segment under tension, while the lower chain segment between the driving pinion and the driven pinion is unguided, the chain deflector being positioned substantially coaxial to the pivot bearing of the rear suspension;

wherein the pivot bearing for the rear suspension is provided on the frame element or on the seat tube immediately adjacent to the frame element;

wherein a number of teeth on the driving pinion is less than or equal to 20 teeth;
a crank drive system including crank arms connected to the shaft of the bottom bracket for allowing manual power input by a user of the bicycle;
a transmission;
the driving pinion being coaxial with the shaft of the bottom bracket and being mechanically coupled to the shaft of the bottom bracket by the transmission;
each of the crank drive system and the electric drive driving the chain and the driven pinion through the driving pinion.

22. The bicycle according to claim 21, wherein the bicycle is a mountain bike.

\* \* \* \* \*